(12) United States Patent
Bradford

(10) Patent No.: US 6,338,796 B1
(45) Date of Patent: Jan. 15, 2002

(54) FILTER

(75) Inventor: Peter Francis Bradford, Sudbury (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/573,898

(22) Filed: May 18, 2000

(30) Foreign Application Priority Data

May 22, 1999 (GB) .............................................. 9911889

(51) Int. Cl.$^7$ .............................................. B01D 29/44
(52) U.S. Cl. ........................ 210/196; 210/300; 210/301; 210/315; 210/455; 210/488; 210/497.01; 210/498
(58) Field of Search ........................ 210/194, 299–301, 210/305, 308, 309, 315, 451, 455, 483, 488, 497.01, 498, 196, 254

(56) References Cited

U.S. PATENT DOCUMENTS 1,456,438 A * 5/1923 Hesselman .................. 210/488

* cited by examiner

Primary Examiner—Matthew O. Savage
(74) Attorney, Agent, or Firm—Stefan K. Chmielewski

(57) ABSTRACT

A filter for use in a fuel injection device, the filter having a bore extending along at least a part of its length and comprising a plurality of channels formed in its outer surface, the channels defining, with a housing part for the filter, passages for fuel flowing from an inlet end of the filter to an outlet end of the filter. Each of the channels is in fluid communication with an adjacent one of the channels by means of a clearance passage. The filter also comprises a plurality of radially extending recesses formed at the inlet and outlet ends of the filter, each of the radially extending recesses being in fluid communication with a channel and defining, at least in part, a plurality of inlet and outlet passages for fuel flowing into and out of the channels respectively. The invention also relates to a filter comprising a sleeve member surrounding the filter, the inner surface of the sleeve member defining clearance passages for fuel flowing through the filter, the outer surface of the sleeve member defining, together with an inner surface of a housing part for the filter, a return passage for fuel discharged from the filter.

21 Claims, 11 Drawing Sheets

SECT. A – A

SECT. B — B

FILTER

TECHNICAL FIELD

The invention relates to a filter for use in a fuel injection device, in particular of the type used as a final stage filter.

BACKGROUND OF THE INVENTION

Final stage filters in fuel injection devices commonly take the form of "edge filters" and are disposed in a fuel injector or injector adaptor to protect the finely dimensioned final stage conduits of a fuel injection device from contamination by undesirably large particles. Such particles may, for example, be the residue of internal deterioration debris, service-induced debris, or matter that has penetrated the main filter.

A fuel injection device having an edge filter typically defines a restricted passageway between a surface of the edge filter and a housing of the device in which the edge filter is disposed. Due to the restricted flow area presented to incoming fuel, an undesirable pressure drop can occur across the filter. In addition, oversize particles which are unable to pass through the restricted flow passageway are continuously represented to the entrance of the passageway. The continuous re-presenting of particles to the entrance of the passageway can cause them to be reshaped by high pressure fuel entering the passageway until they are sufficiently small in at least one dimension to pass therethrough.

Another problem which can occur in edge filters is that the housing of the filter which partially defines the restricted passageway can elastically extend so as to dilate away from the outer surface of the edge filter, thereby temporarily widening the passageway and permitting oversize contaminant particles to pass.

It is known to provide an edge filter having a plurality of filter segments arranged in a loop around the circumference of the filter. The filter segments are separated by narrow clearances which prevent oversize particulate contaminants present in the fuel from passing through the filter. High pressure forces exerted in each of the channels tend to balance each other out, thereby reducing dilation of the outer housing. The problem still exists, however, that a pressure drop can occur across the filter due to the restricted flow area.

SUMMARY OF THE INVENTION

It is an object of the present invention to provide a filter which alleviates the aforementioned problems of the prior art.

According to the present invention, there is provided a filter for a fuel injection device, the filter having a bore extending along at least a part of its length and comprising;
- a plurality of channels formed in its outer surface, the channels defining, with a housing part for the filter, passages for fuel flowing from an inlet end of the filter to an outlet end of the filter, each of the channels being in fluid communication with an adjacent one of the channels by means of a clearance passage, and;
- a plurality of radially extending recesses or passages formed at the inlet and outlet ends of the filter, each of the passages being in fluid communication with a channel and defining a plurality of inlet and outlet passages for fuel flowing into and out of the channels respectively.

Each of the inlet and outlet passages provides direct fluid communication with a different one of the channels such that fuel flowing in to the filter through an inlet passage and flowing out through an outlet passage must pass through at least one clearance passage prior to being discharged from the filter.

Due to the multiple number of inlet passages presented to fuel at the inlet end of the filter, the pressure drop across the filter is reduced. The provision of a plurality of clearance regions through which fuel can flow between adjacent channels also serves to minimise the pressure drop across the filter.

The clearance passages may be defined by projecting sections on the filter and the inner surface of the outer housing part, the projecting sections of the filter being radially spaced around the filter so as to separate adjacent channels.

Conveniently, the inlet end of the filter is in abutment with a collar member which defines, in part with the radially extending recesses at the inlet end of the filter, the inlet passages for fuel. Alternatively, the inlet passages for fuel may be defined solely by radially extending passages formed within the filter towards the inlet end of the filter, thus providing the advantage that the filter is a unitary part. Conveniently, the outlet passages for fuel are defined by the radially extending recesses at the outlet end of the filter in combination with a step in the outer housing.

The bore provided in the filter may include a collection zone for particles located downstream of the inlet passages. The collection zone may be provided by a permeable cupped member which permits fuel to flow therethrough at a restricted rate but which prevents the passage of particulate contaminants. This provides the advantage that reverberation effects which can occur during operation of the filter are reduced, thereby reducing particle excitation.

The provision of such a collection zone downstream of the inlet passages is advantageous in that relatively large contaminant particles which are unable to enter the inlet passages, either due to their large size or due to inertia, can be retained and deformation of such particles to allow their passage through the filter can be avoided.

The filter may be provided with a sleeve member surrounding the filter, an inner surface of the sleeve member defining, with the projecting sections on the filter, the clearance passages between adjacent channels and the outer surface of the sleeve member defining, with an inner surface of the housing part, a return passage for fuel discharged from the filter. The flow of fuel back through the return passage exerts a pressure on the sleeve member which acts against the pressure exerted by fuel flowing through the clearance passages and the restricted passages, thereby reducing dilation of the outer housing part.

According to another aspect of the invention, there is provided a filter for a fuel injection device, comprising a sleeve member surrounding the filter, the inner surface of the sleeve member defining passages for fuel flowing through the filter and the outer surface of the sleeve member defining, with an inner surface of a housing part for the filter, a return passage for fuel discharged from the filter.

The flow of fuel back through the return passage exerts a pressure on the sleeve member which acts against the pressure exerted by fuel flowing through the passages, thereby reducing dilation of the housing part. Conveniently, the sleeve member may be a cylindrical sleeve member.

According to another aspect of the invention, there is provided a fuel injection device having a housing part and a filter disposed within the housing to prevent the passage of particulate contaminants present in a fuel flow through the filter, the filter having a bore extending along at least a part of its length and comprising a plurality of channels formed in its outer surface, the channels defining, with the housing part of the filter, passages for fuel flowing from an inlet end of the filter to an outlet end of the filter, each of the channels being in fluid communication with an adjacent one of the channels by means of a clearance passage, and a plurality of radially extending recesses formed at the inlet and outlet ends of the filter, each of the recesses being in fluid communication with a channel and defining a plurality of inlet and outlet passages for fuel flowing into and out of the channels respectively.

BRIEF DESCRIPTION OF THE DRAWINGS

The invention will now be described, by way of example only, with reference to the following drawings in which.

DESCRIPTION OF THE PREFERRED EMBODIMENT

Figure 1:
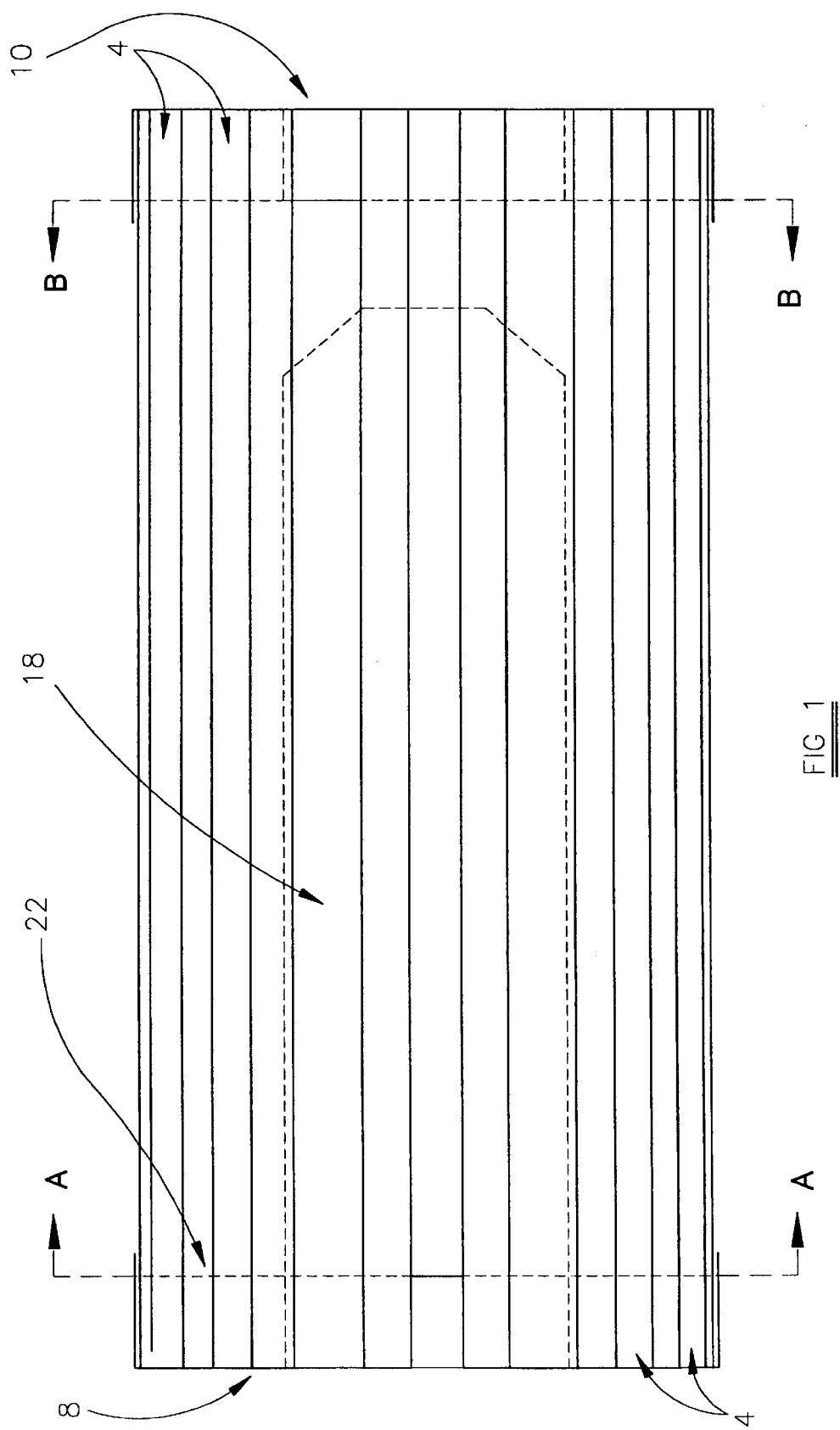
FIG. 1 shows a side view of a filter in accordance with a first embodiment of the present invention.
Figure 2:
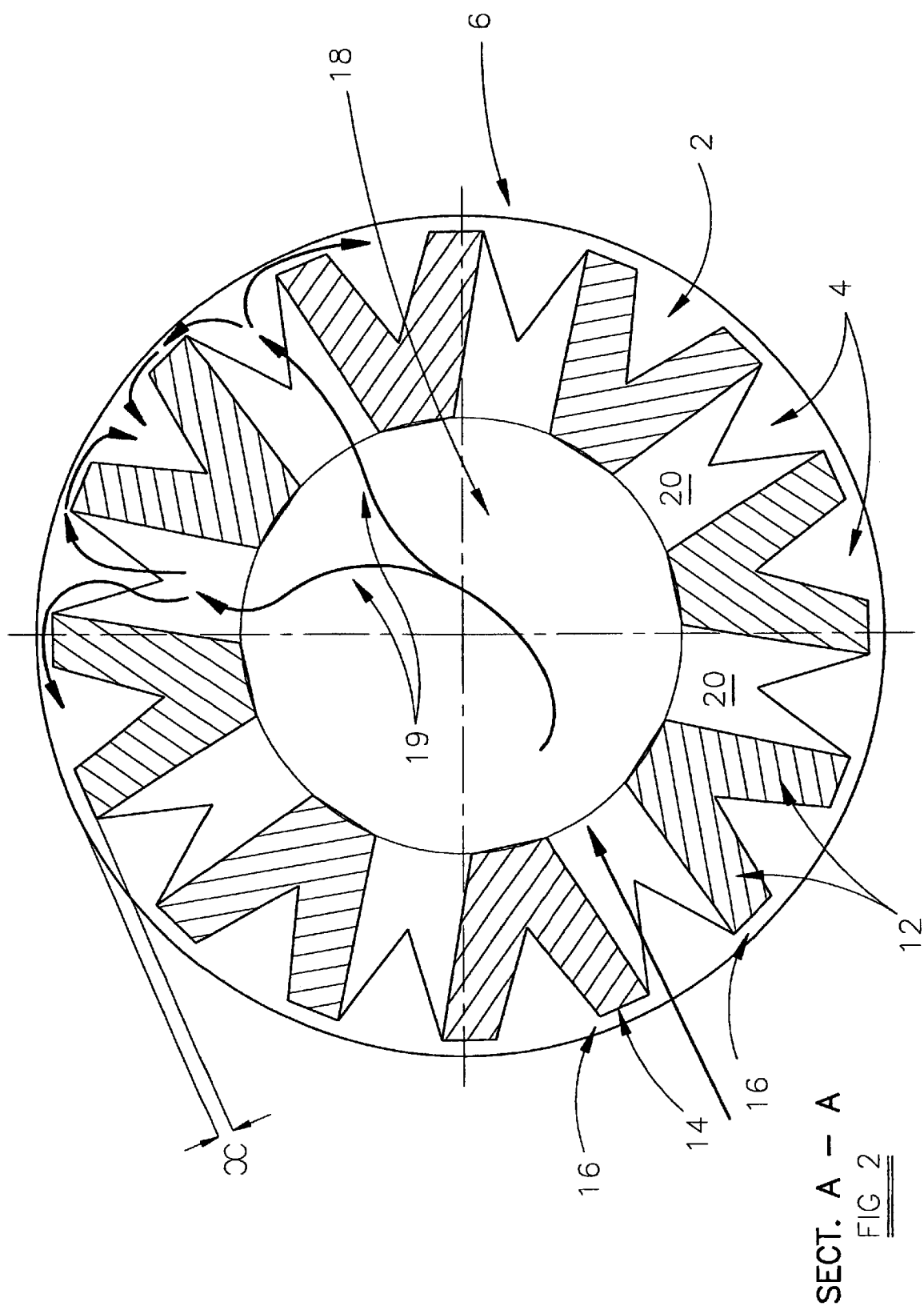
FIG. 2 shows an end-view, along line A—A, of the filter shown in FIG. 1.

Referring to FIGS. 1 and 2, a filter, referred to generally as 2, includes sixteen channels or grooves 4 formed in its outer surface. The channels or grooves are of V-section, as can be seen most clearly in FIG. 2, and are formed in parallel with one another along the length of the filter 2. The filter 2 is located within an outer housing part 6 of the fuel injection device in which the filter 2 is to be employed, the filter having an inlet end 8, into which fuel to be filtered is introduced, and an outlet end 10, from which filtered fuel is discharged to the downstream parts of the fuel injection device. The diameter of the filter at the inlet and outlet ends is slightly larger than the diameter of the central part of the filter, such that the ends of the filter locate the filter coaxially within the housing part 6.

FIG. 2 shows a cross-sectional view of the inlet end 8 of the filter 2. The channels 4 formed in the filter 2 define, with the inner surface of the housing part 6, flow passages for fuel along the length of the filter 2. Each of the channels 4 is spaced apart from the adjacent channels by projecting sections 12, radially spaced around the filter, which define clearances 16 with the outer housing part 6, the clearances 16 providing fluid communication between neighboring channels 4. The projecting sections 12 are machined such that their radially outermost surfaces 14 are of flattened form and such that the clearances 16 are of an appropriate dimension, x, to define a suitably restrictive flow path for fuel depending on the particular application for which the filter is intended. Typically, for example, x is about 0.015 mm which, for a channel length of 16.0 mm, provides a fuel flow area of 3.8 mm$^2$. For a clearance of 0.025 mm and a channel length of 16 mm, the fuel flow area is 6.4 mm$^2$. The filter 2 is also provided with a central bore 18, as represented by the dotted line in FIG. 1, partially extending along the length of the filter 2.

As can be seen most clearly in FIG. 2, the filter 2 is also provided with eight inlet recess or apertures 20, radially spaced around the periphery of the central bore 18, and extending along only a part of the length of the filter 2, as indicated by the dotted line 22 shown in FIG. 1. The inlet recesses 20 provide fluid communication between the central bore 18 and alternate ones of the sixteen channels 4 formed in the surface of the filter 2, the arrows 19 representing the passage of fuel flowing from the central bore 18, through the inlet recesses 20 and subsequently into the channels 4. At the outlet end 10 of the filter 2, but not illustrated in FIGS. 1 and 2, a further eight radially spaced recesses are provided around the periphery of the central bore 18 of the filter 2. The eight outlet recesses are arranged so as to provide fluid communication with those of the sixteen channels 4 which are not in fluid communication with the inlet recesses 20. Thus, the eight outlet recesses are spaced around the periphery of the central bore 18 such that they are "out of phase" with the inlet recesses 20 at the inlet end 8. The channels 4 are therefore either in fluid communication with the recesses 20 at the inlet end 8 or the recesses formed at the outlet end 10.

Figure 3:
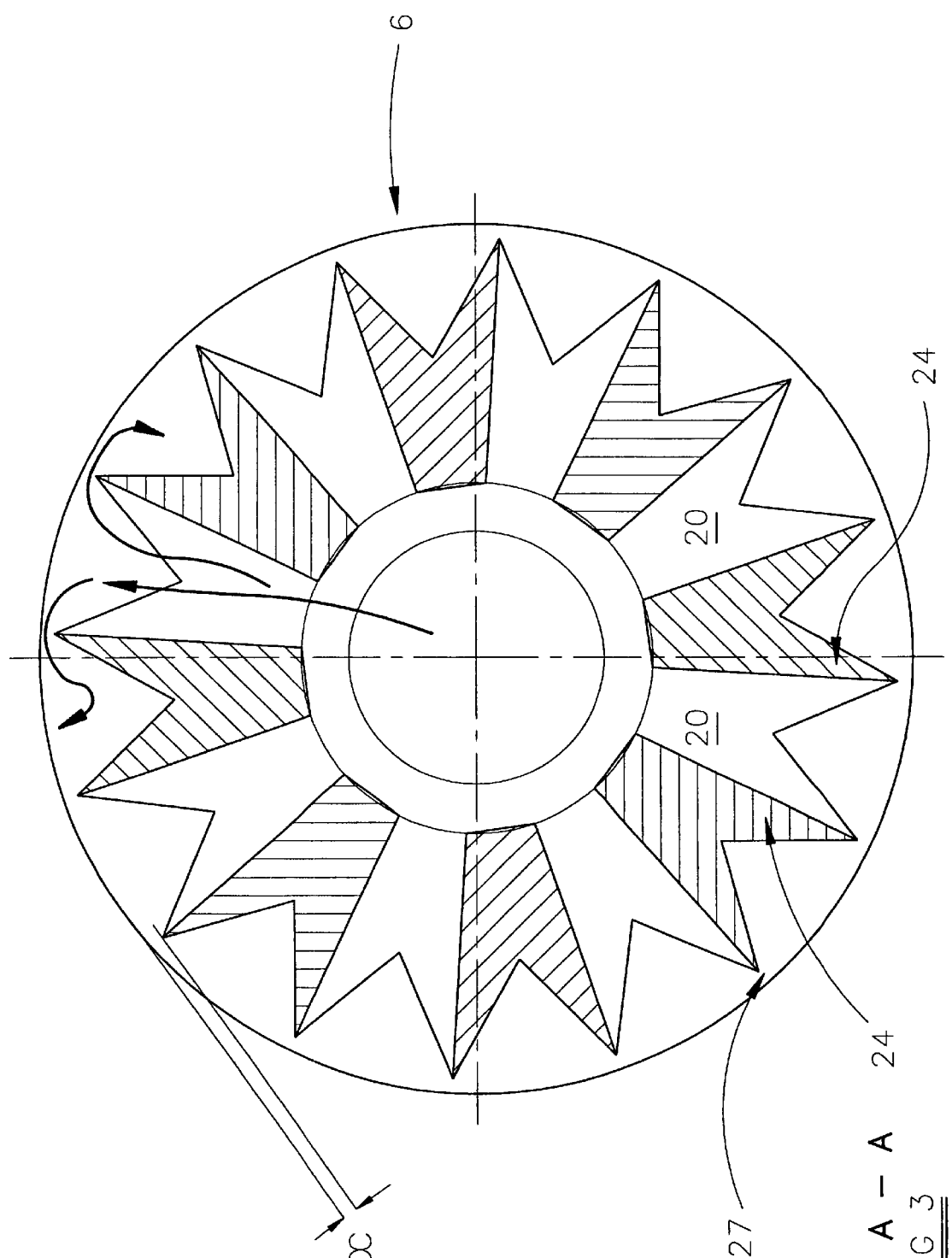
FIG. 3 shows an end-view of an alternative embodiment of the filter.

Referring to FIG. 3, an alternative embodiment the filter 2 includes projecting sections 24 which have unflattened radially outermost surfaces defining clearances 27 of a different form between the outermost end of the projecting sections 24 and the inner surface of the housing part 6.

Figure 4:
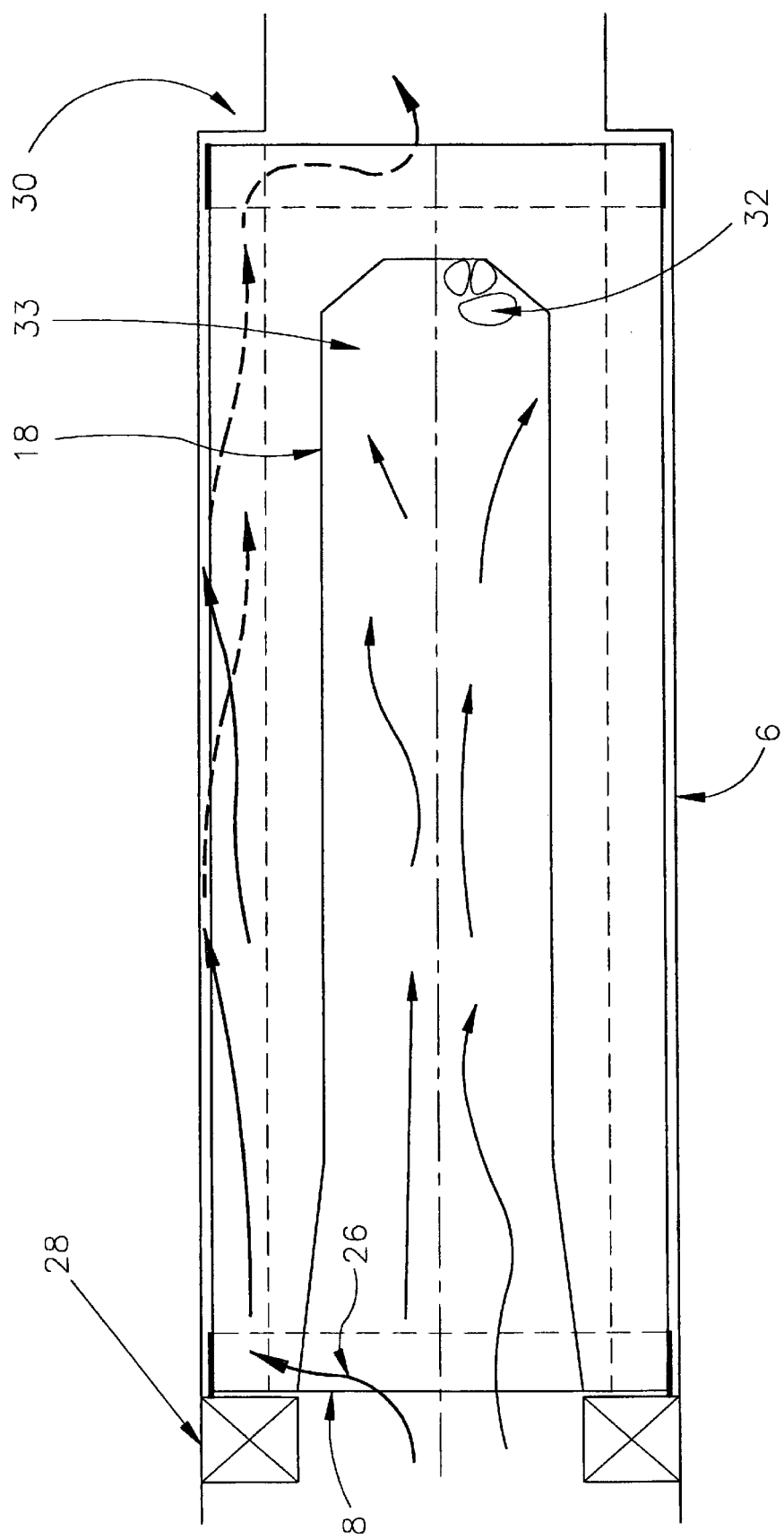
FIG. 4 shows a side view of the filter when arranged within a housing part.

Referring to FIG. 4, the filter 2 is located within the outer housing part 6 such that its inlet end 8 abuts with an annular collar member 28. The collar member 28 is arranged such that fuel does not flow directly into the inlet recesses 20, or into the channels 4 through the inlet end 8, but is forced to flow into the central bore 18 and then into the inlet recesses 20, as indicated by the bold arrow 26. The inlet recesses 20 therefore define, with the collar member 28, inlet passages for fuel to enable fuel to flow into the channels 4 of the filter. It will be appreciated that in flowing from the central bore 18 to the inlet recesses 20 the direction of fuel changes from axial to radial.

Fuel flowing through an inlet recess 20 into a channel 4 is able to flow through a clearance 16, defined by the projecting sections 12, into an adjacent channel 4. Thus, as fuel flows from the inlet end 8 of the filter 2 towards the outlet end 10 it passes through one or more clearances 16 as it flow between adjacent channels 4. At the outlet end 10 of the filter, the outlet recesses are in abutment with a stepped portion 30 of the outer housing part 6, such that, in the same way in which fuel entering the filter is forced to pass through the inlet recesses 20, fuel flowing out from the channels 4 is forced to exit the filter 2 through said outlet recesses. It will be appreciated that, due to the communication between the inlet and outlet recesses and different ones of the channels, fuel flowing into the filter through an inlet recess and flowing out through an outlet recess must pass through at least one clearance 16 prior to being discharged from the filter.

By providing a multiple number of inlet passages for fuel, defined by the multiple inlet recesses 20, the pressure drop across the filter 2 can be minimized. In addition, the large number of clearances 16 means a higher fuel flow area is presented to fuel passing through the filter 2.

If the fuel flow entering the filter contains particulate contaminants, they may become lodged at the entry of the inlet recesses 20 if they are too large to pass therethrough. However, unlike in conventional edge filters, such particles are not impelled to remain in the same position until pressure pulsations begin to extrude them. In the present invention, fuel movement causes such particles 32 to dislodge from the entry points of the inlet recesses 20 such that they flow further downstream into the central bore 18 where they eventually come to rest in a collection zone 33. Additionally, some particles have sufficient inertia that they cannot turn into the inlet recesses 20 as they enter the filter, and they therefore continue downstream into the collection zone.

The length of the central bore 18 within the filter 2 should be commensurate with the expected number of particles 32 to be collected during the service life of the filter 2 for any particular application.

Due to the high pressure of fuel flowing into the filter 2, some particulate contaminants of a sufficiently small size, may be forced to pass through the inlet recesses 20 into a respective channel 4. Thus, the dimensions of the inlet recesses 20 must be selected so as to prevent particles greater than a predetermined size from entering the channels 4. Initially, particulate contaminants having a small enough dimension to pass into the channels 4 do not pass through the clearances 16, but are inclined to follow the least resistant flow passage and travel along the axial length of the channel 4 into which they are introduced, until they abut with the step 30 in the housing part at the outlet end 10 of the filter.

Figure 5:
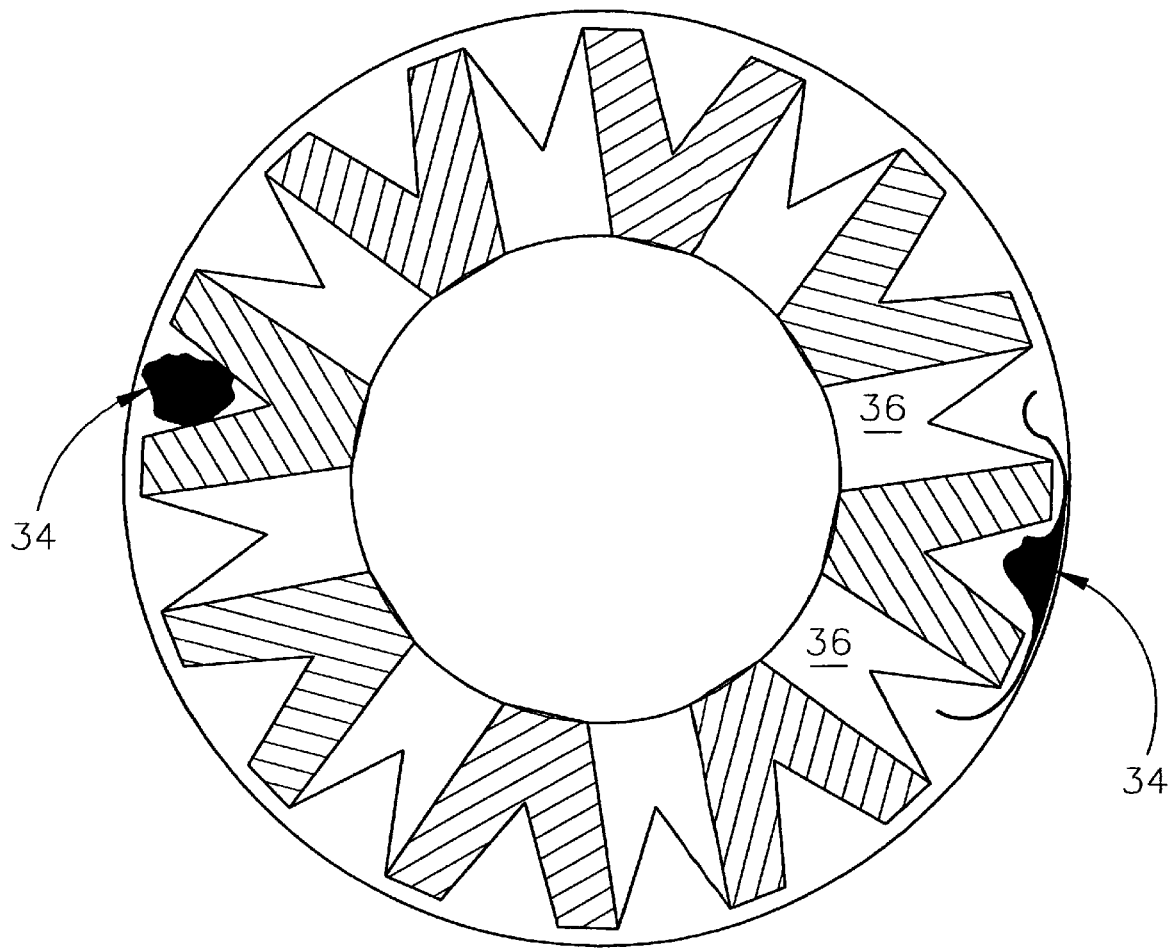
FIG. 5 shows an end-view, along line B—B, of the filter shown in FIG. 1.

FIG. 5 shows a cross-sectional view of the outlet end 10 of the filter 2, showing the outlet passages 36 for fuel and the particles 34 which, having passed along the length of the channels 4, abut with the step 30. Owing to the flow of high pressure fuel through the channels 4 and into the outlet recesses, particles 34 abutting the step 30 are subjected to high pressure pulsations, causing them to extrude into adjacent channels via the clearances 16. As the particles are gradually extruded into the adjacent channels, as shown in the right hand side of FIG. 5, they are impelled to turn through 90° causing parts of the particle to shear off. Such particles, in adopting the profile and area of the channels 4 into which they are extruded, are thereby reduced to a small size.

The filter described hereinbefore has several advantageous features. Firstly, the fuel pressure drop across the filter is minimized due to the large number of inlet passages, defined by means of the inlet recesses, and the large number of clearances between adjacent channels. Secondly, two routes are provided for particles entering the filter, in that particles can either pass through the inlet recesses 20 or, if they are of larger dimension, they can pass directly into the central bore 18 where they eventually come to rest in the collection zone 33. Thus, every particle presented to the filter 2 is not compelled to pass through the filter. Additionally, the nominal maximum size of particles which can pass through the filter 2 is determined by the dimensions of the inlet recesses 20. Finally, by introducing shear in extruded parts of the particles, the size of the particles exiting the filter 2 can be greatly reduced.

Figure 6:
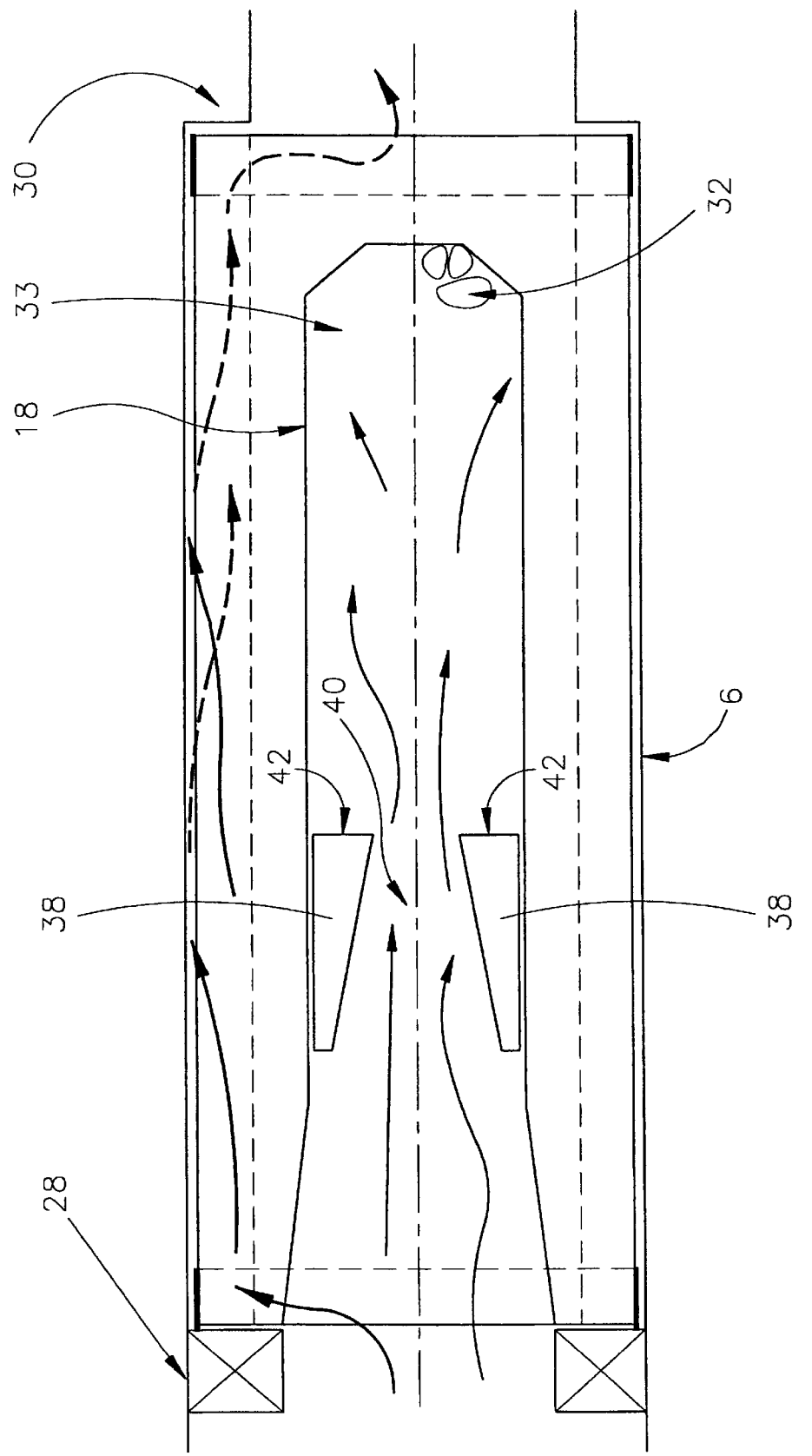
FIGS. 6–9 show side views of alternative embodiments of the filter.

Referring to FIG. 6, an alternative embodiment of the filter 2 is shown in which an insert piece or member 38 is arranged within the center bore 18. The insert member 38 is shaped so as to present a reduced flow area to fuel and particles flowing into the central bore 18 and onwards to the collection zone 33. The insert member 38 may be in the form of an annular member defining a flow passage region of decreasing flow area having a downstream outlet orifice 40. The end face of the insert member 38 defines a barrier 42 for particles 32 within the collection zone 33, thus preventing the return flow of particles through the orifice 40. The return flow of particles 32 from within the collection zone 33 to the inlet end 8 of the filter can arise due to reverberation within the collection zone 33 during operation of the fuel injection device.

Figure 7:
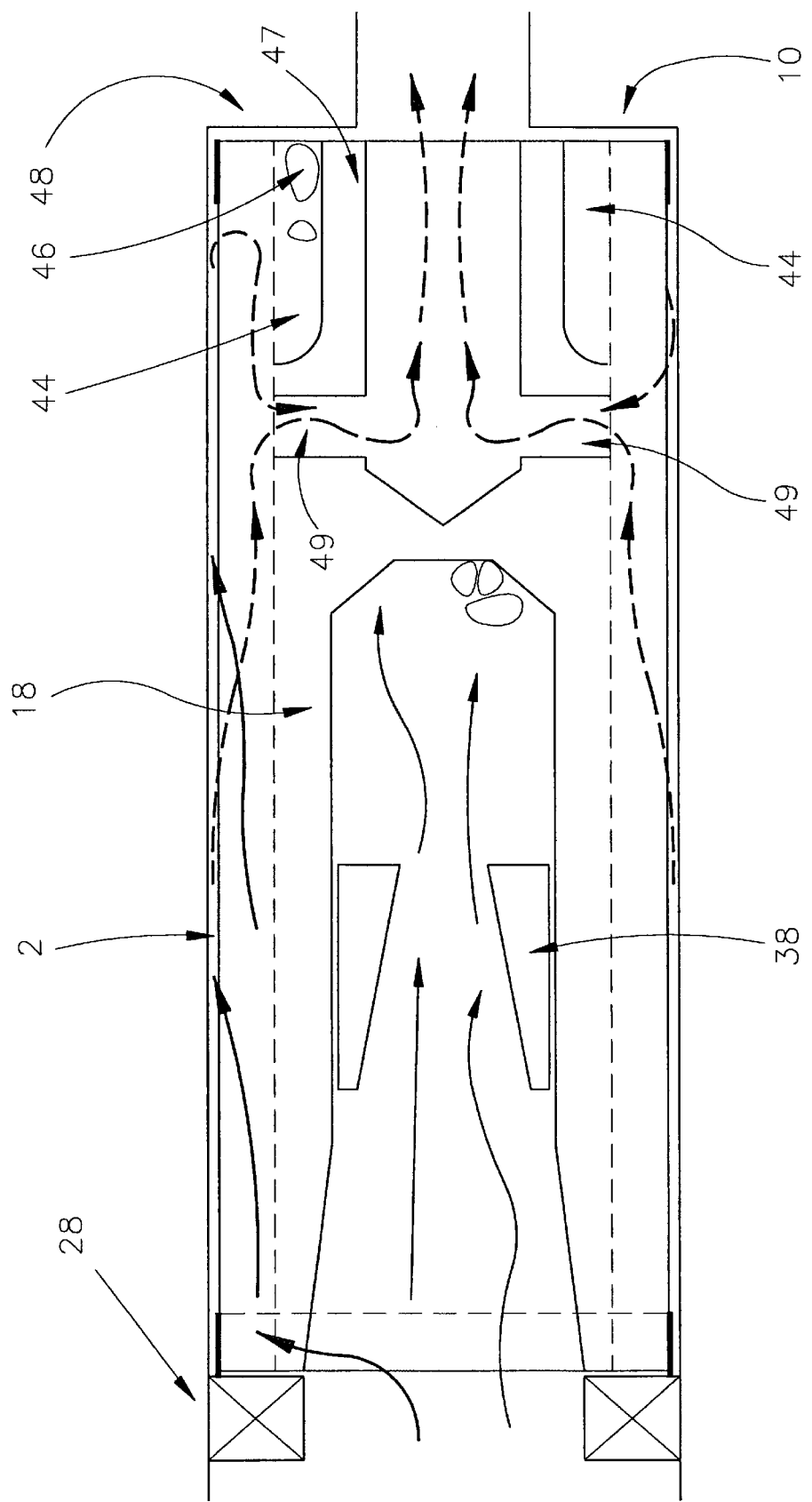

An alternative embodiment of the filter is shown in FIG. 7, in which retaining recesses 44 are provided at the outlet end 10 of the filter 2 which co-operate with a step 48 in the outer housing part 6, to provide retention pockets for particles of larger shape which may have passed through the channels 4. For example, particles may adopt a triangular form in passing through the channels 4. In this embodiment the step 48 must be of sufficient size to prevent both the flow of fuel from channels 4 which are not in fluid communication with outlet recesses and to prevent the flow of fuel from the retaining recesses 44. Thus, radially extending ports 49 are provided to allow the passage of fuel from those channels 4 in communication with outlet recesses 36 to a central drilling 47 formed in the filter at its outlet end 10.

The embodiment of the invention provides the advantage that any larger particles extruded through the clearances 16 are retained within the retaining recesses 44, whilst fuel is able to flow out through the ports 49 into the central drilling 47 from where it exits the filter 2. Larger particles passing through the clearances 16 may otherwise adopt a disc-like form which can result in particles of a significant size being discharged from the filter 2. By retaining such larger particles within the retaining recesses, the formation of any such disc-like particles is prevented. Collection of particles 46 within the retaining recesses 44 does not impede the filter action, as the collected particles 46 are isolated from the outlet recesses. The size of the retaining recesses should be chosen so as to provide sufficient capacity for the expected number of particles to be retained therein during the service life of the filter for any particular application.

Figure 8:
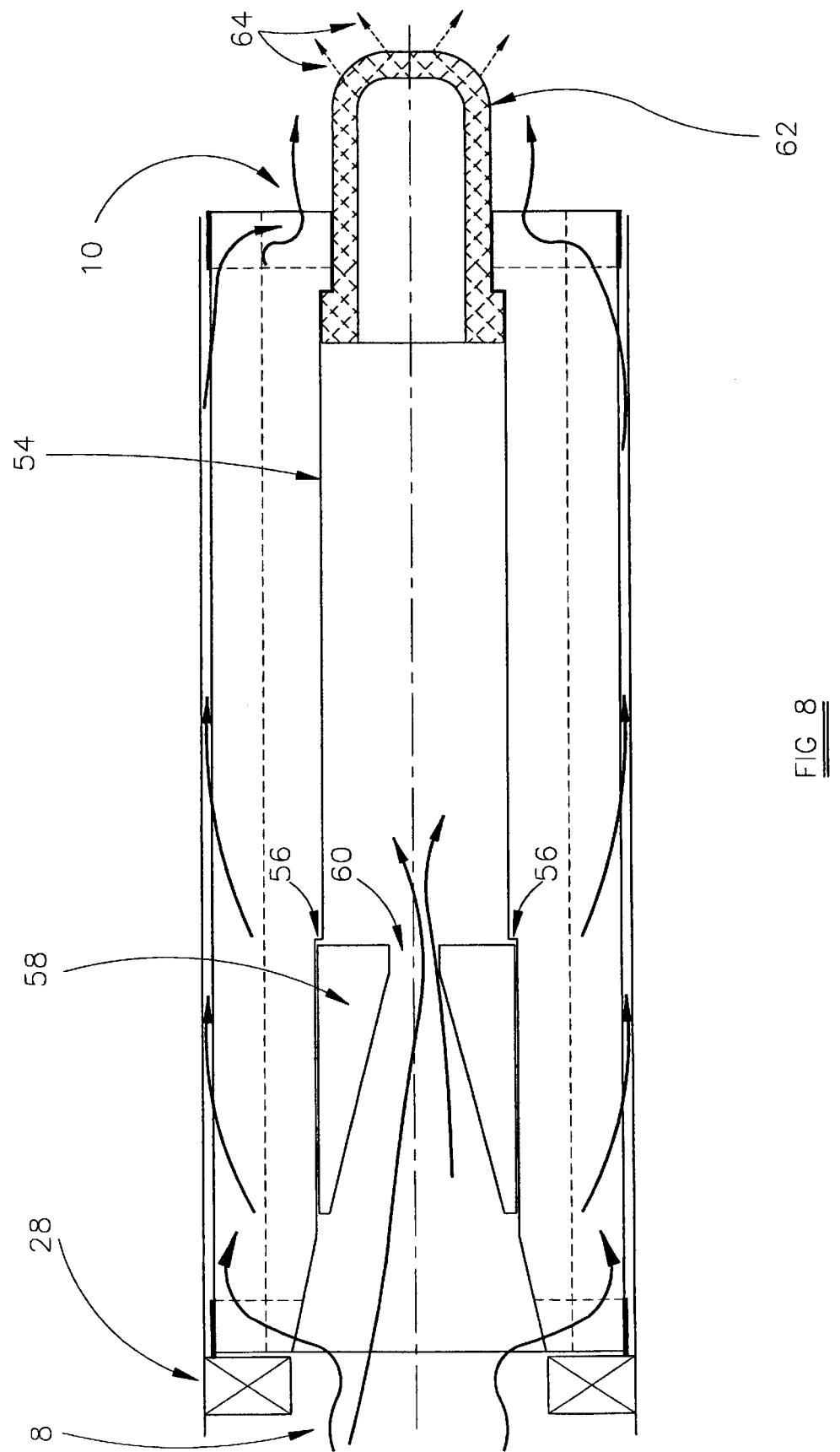

FIG. 8 shows a further alternative embodiment of the invention in which the filter 2 is provided with a central through bore 54 having an annular step 56 in its surface. The annular step 56 co-operates with an insert piece or member 58 defining a flow passage for fuel of decreasing flow area, the insert member 58 having an outlet orifice 60 downstream of the inlet end 8 of the filter 2. In addition, the central bore 54 is provided with a cupped member 62 at the outlet end 10 of the filter 2 providing a collection zone for particles. The cupped member 62 may be formed from a sinter or mesh material or any other material having a pore size no greater than the dimensions of the inlet recesses 20 provided at the inlet end 8 of the filter 2. Thus, the cupped member 62 allows fuel to flow from the bore 54 from the filter, as indicated by the arrow 64, whilst particulate contaminants in the fuel are retained therein. The provision of a permeable cupped member 62 reduces the possibility of reverberation occurring within the bore during operation of the fuel injection device.

Figure 9:
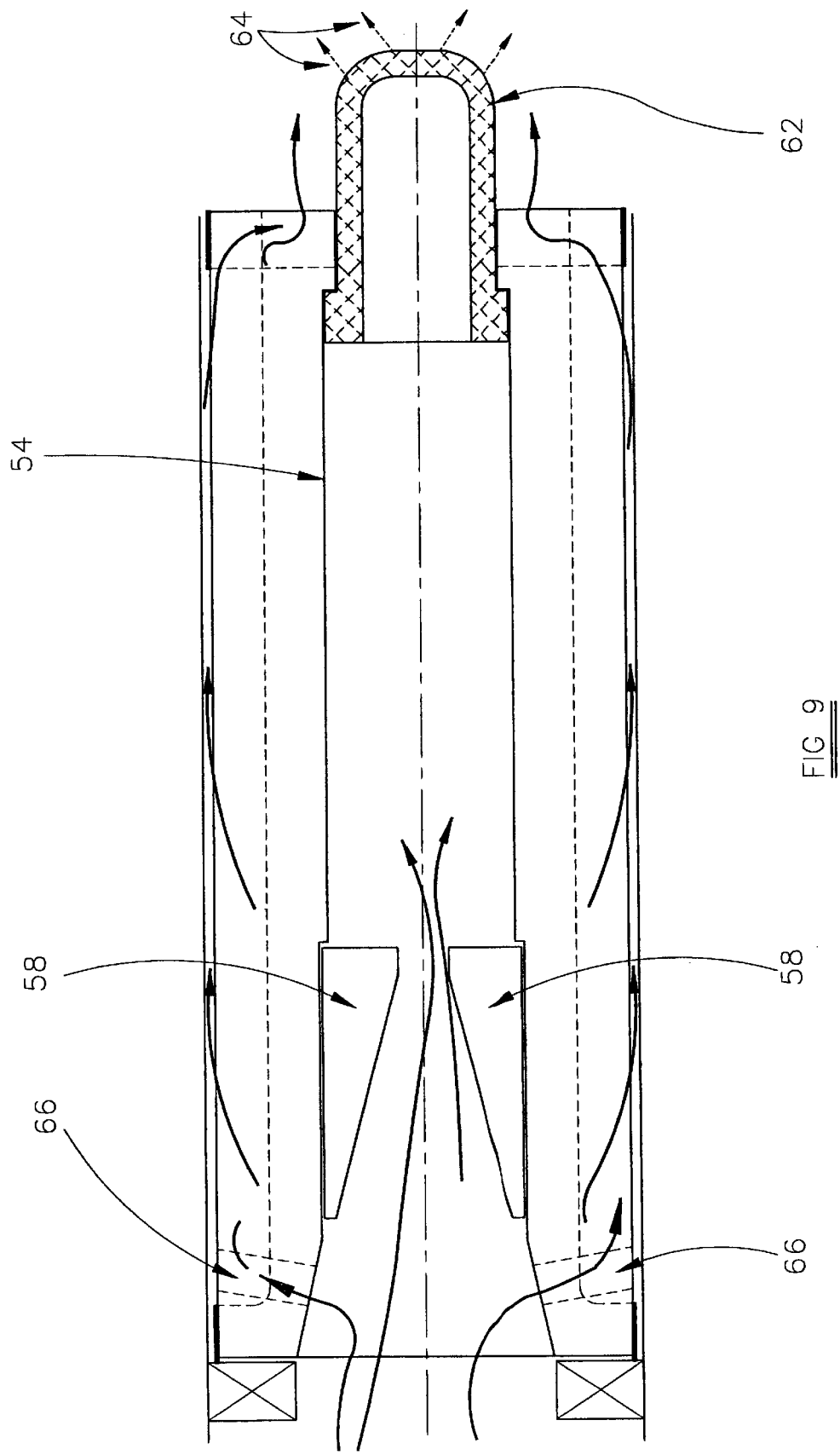

FIG. 9 shows an alternative embodiment to that shown in FIG. 8, in which the need for the collar member is removed by forming inlet recesses 66, only two of which are shown, within the filter rather than in the end-face of the inlet end 8. Thus, the filter 2 is a unitary part. It will be appreciated that inlet recesses 66 of the type shown in FIG. 9 may be provided in any of the embodiments of the invention described herein.

Figure 10:
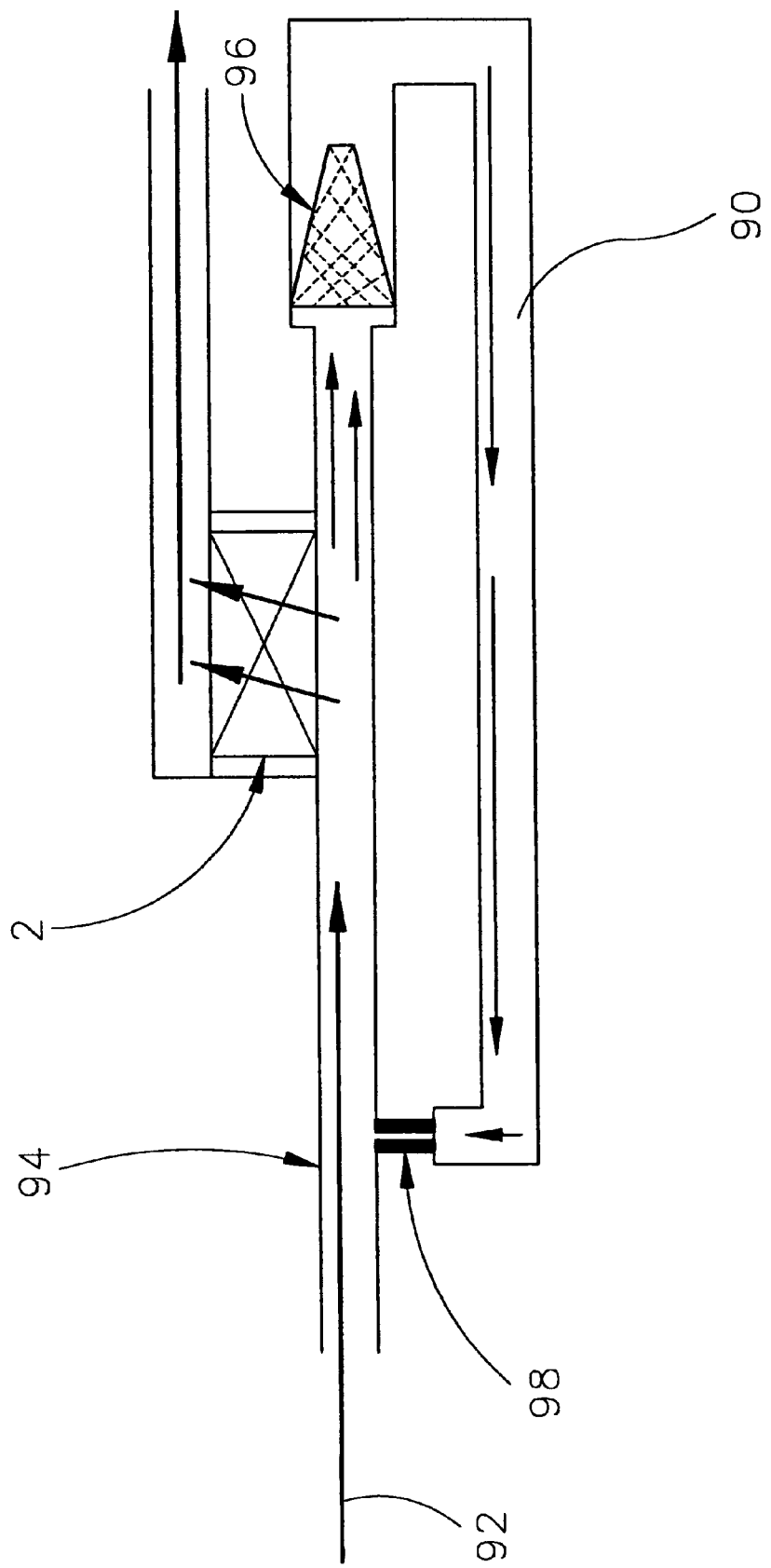
FIG. 10 shows a schematic view of a further alternative embodiment of the invention.

FIG. 10 is a schematic view of a further alternative embodiment of the invention. The flow of fuel towards the filter 2 is represented by the arrow 92. The filter arrangement includes an inlet passage 94 through which the inlet fuel flow 92 flows. The inlet fuel flow 92 can either flow through the filter 2 or can by-pass the filter and flow through a return flow passage 90 for fuel, fuel flowing through the return flow passage 90 being reintroduced to the inlet passage 94 through a restriction 98. The return flow passage 90 is provided with a collector 96, or other filtering means, which permits fuel to flow therethrough at a restricted rate but which prevents the passage of relatively large particulate contaminants carried by the by-pass flow. The collector 96 therefore defines a collection zone for particles and may, for example, take the form of the cupped member 62 in FIGS. 8 and 9. By providing the return flow passage 90 for fuel, at least some of the particulate contaminants carried by the inlet flow 92 will not pass through the filter 2 and, instead, will be removed from the flow by the collector 96.

The embodiment of the invention shown in FIG. 10 provides an advantage over the embodiments described previously in that some of the particulate contaminants present in the inlet fuel flow 92 will not pass through the filter 2. Contaminants and debris carried by the inlet fuel flow 92 having a dimension greater than that of the clearances 16, 27, 72 will flow through the return flow path 90, rather than being broken down or shaped by the filter 2. Where the filter 2 is used alone and there is no alternative flow route for the inlet flow, eventually all of the particulate contaminants present in the inlet fuel flow will be shaped or broken down as they are passed through the filter 2.

It will be appreciated that the restriction 98 provided in the return flow passage 90 serves to limit the rate at which the return flow of fuel is reintroduced to the inlet passage 94. It will further be appreciated that the filter 2 in FIG. 10 may take the form of any of the embodiments of the filter described herein, including the embodiments shown in FIGS. 8 and 9.

Figure 11:
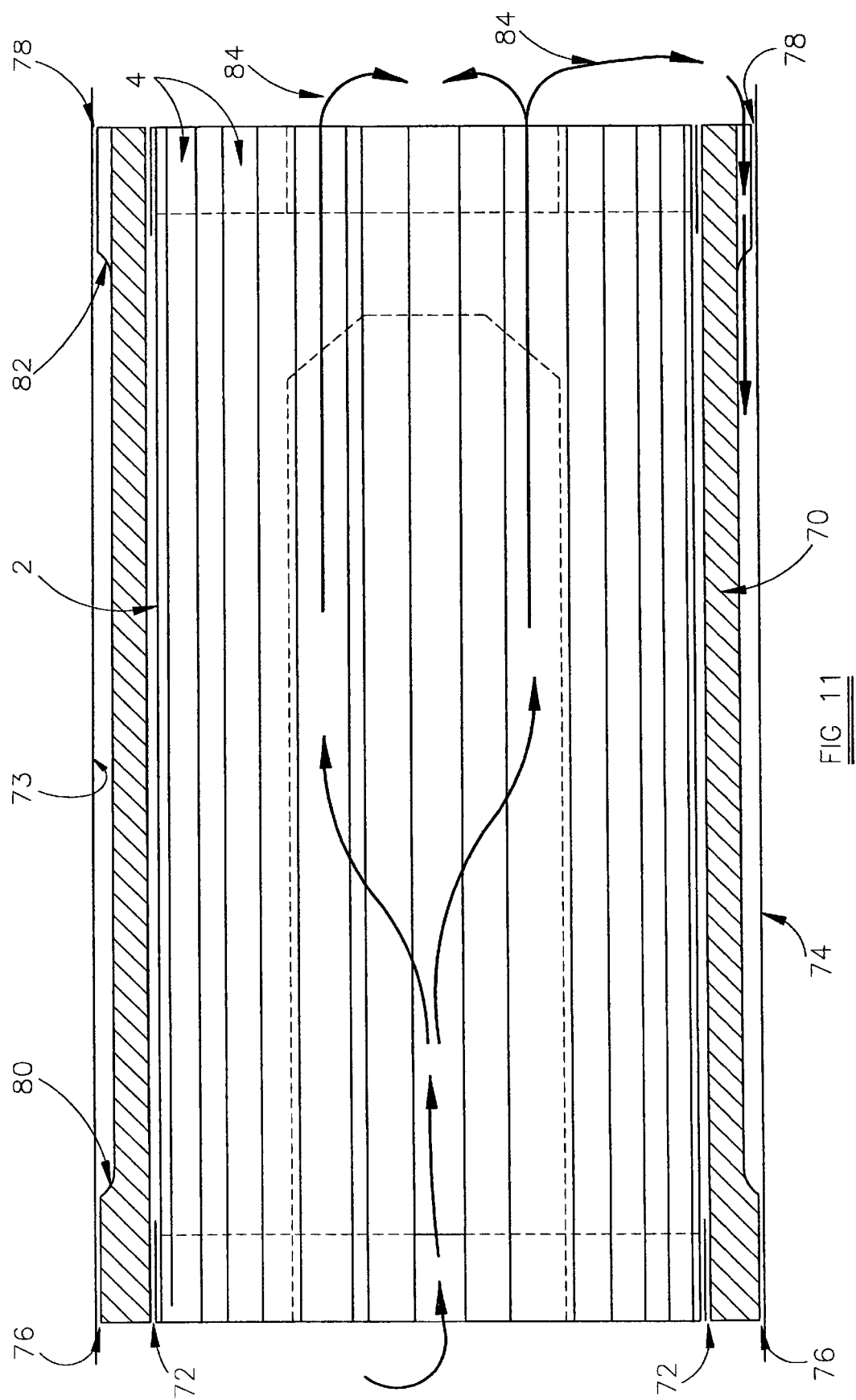
FIG. 11 shows a side view of a part of a further alternative embodiment of the filter.

Referring to FIG. 11, a further alternative embodiment of the invention is shown in which the filter 2 is provided with a thin-walled, hollow sleeve member 70, preferably of cylindrical form, surrounding the filter 2. The inner surface of the sleeve member 70 defines, with the projecting sections of the filter, clearance passages 72 providing fluid communication between adjacent channels 4 in the filter surface, as hereinbefore described. The sleeve member 70 is located within a bore 73 of an outer housing part 74, the outer surface of the sleeve member 70 having stepped parts 80,82 extending along a part of the length of the sleeve member 70 at the inlet and outlet ends 8,10 of the filter 2 respectively. The stepped parts 80,82 define, with the inner surface of the outer housing part 74, inlet and outlet clearances 76 and 78 respectively.

As fuel exits the filter 2 from the outlet recesses at the outlet end 10 it is able to flow back through the outlet clearance 78 along the outer surface of the sleeve member 70, thus causing pressure to act in a radially inwards direction on the sleeve member 70. This fuel pressure counteracts fuel pressure from within the sleeve member 70 due to the high pressure of fuel flowing through the channels, which acts radially outwards. The provision of the sleeve member 70 therefore enables the disadvantageous effects of dilation of the housing to be reduced. It will be appreciated that the sleeve member 70 is not limited to use with a filter of the type having radially extending inlet and outlet recesses as hereinbefore described, but may be used in combination with other types of edge filter.

The channels formed in the outer surface of the filter need not be of V-section, but may take any form suitable to maintain a sufficient flow area for fuel passing through the filter. In addition, the channels need not be arranged in parallel along the length of the filter but may be of curved or helical form. It will be appreciated that the filter may include any number of channels and projecting sections, an increased number of channels providing a higher flow area for fuel and therefore reducing further the pressure drop across the filter.

The filter of the present invention is intended for use in a fuel injection device of the type in which, for example, fuel is driven through the filter by a pump located upstream of the filter or by the fuel pressure within a common rail. However, it will be appreciated that the filter may also be employed in an arrangement in which fuel is drawn through the filter, for example by a pump located downstream of the filter.

What is claimed is:

1. A fuel filter, comprising:
   a generally cylindrical body;
   a central bore extending axially into the body from an inlet end of the filter towards an outlet end of the filter;
   inlet grooves extending axially on an outer surface of the filter, outlet grooves extending axially on the outer surface of the filter, each inlet groove being adjacent to a pair of said outlet grooves;
   a plurality of inlet recesses and outlet recesses, each inlet recess being proximate the inlet end of the filter and extending from the bore radially outwardly to a corresponding inlet groove, and each outlet recess being proximate the outlet end of the filter extending radially inwardly from a corresponding outlet groove.

2. The filter as claimed in claim 1, further comprising projecting sections that extend axially between each inlet groove and the outlet grooves adjacent thereto.

3. The filter as claimed in claim 2, wherein the projecting sections include unflattened radially outermost surfaces.

4. The filter as claimed in claim 2, wherein the projecting sections include flattened radially outermost surfaces.

5. The filter as claimed in claim 2, further comprising a sleeve member surrounding the filter, said sleeve member having an inner surface defining, in conjunction with the projecting sections, clearance passages between adjacent grooves.

6. The filter as claimed in claim 5 wherein said sleeve member is substantially cylindrical.

7. The filter as claimed in claim 1, further comprising a particle collection zone defined by said central bore.

8. The filter as claimed in claim 7, wherein the central bore extends through the outlet end of the filter and the particle collection zone comprises a permeable cupped member received in the central bore proximate the outlet end of the filter.

9. The filter as claimed in claim 7, further comprising an insert member disposed in the central bore, said insert member defining a flow passage of decreasing flow area for fuel flowing into the particle collection zone.

10. The filter as claimed in claim 9, wherein the central bore is provided with a step with which the insert member cooperates.

11. The filter as claimed in claim 1, further comprising at least one retaining recess disposed in the outlet end of the filter, said at least one retaining recess being downstream of said outlet grooves.

12. The filter as claimed in claim 1 wherein the inlet recesses comprise inlet apertures extending from the bore radially outward to a corresponding inlet groove.

13. A filter assembly for filtering fuel, comprising:
a filter having a generally cylindrical body, a central bore extending axially into the body from an inlet end of the filter towards an outlet end of the filter, inlet grooves extending axially on an outer surface of the filter, outlet grooves extending axially on the outer surface of the filter, each inlet groove being adjacent to a pair of said outlet grooves, a plurality of inlet recesses and outlet recesses, each inlet recess being proximate the inlet end of the filter and extending from the bore radially outwardly to a corresponding inlet groove, and each outlet recess being proximate the outlet end of the filter extending radially inwardly from a corresponding outlet groove; and
a housing having a chamber, said chamber having ant inner surface configured for receiving the filter, said inner surface and said plurality of inlet and outlet grooves on said outer surface of said filter define adjacent flow channels and each channel being in fluid communication with an adjacent channel by means of a clearance passage whereby fuel flowing through the inlet recesses of said filter must pass through at least one clearance passage before exiting through the outlet recesses of said filter.

14. The filter assembly as claimed in claim 13, wherein the inlet recesses comprise inlet apertures extending from the bore radially outward to a corresponding inlet groove.

15. The filter assembly as claimed in claim 14, further comprising a collar member in abutment with the inlet end of the filter whereby the plurality of inlet recesses together with said collar member define inlet channels.

16. The filter assembly as claimed in claim 13, wherein said housing further comprises a housing step in abutment with the outlet end of the filter whereby the plurality of outlet recesses together with said housing step define outlet channels.

17. The filter assembly as claimed in claim 13 wherein said assembly further comprises a filter by-pass flow passage.

18. The filter assembly as claimed in claim 17 wherein the by-pass flow passage includes a second collection zone.

19. The filter assembly as claimed in claim 18 wherein the second collection zone is defined by a second collector.

20. The filter assembly claimed in claim 18 wherein the by-pass flow passage further includes a return line downstream of the second collection zone in fluid connection with the inlet end of the filter.

21. A filter assembly as claimed in claim 13, further comprising:
a sleeve member surrounding the filter, said sleeve member having an outer surface;
said inner surface of said housing chamber configured for receiving the filter and sleeve member; and
a return passage defined between said inner surface of the housing chamber and said outer surface of the sleeve member for fuel exiting said at least one clearance passage.

* * * * *